Figure 1:
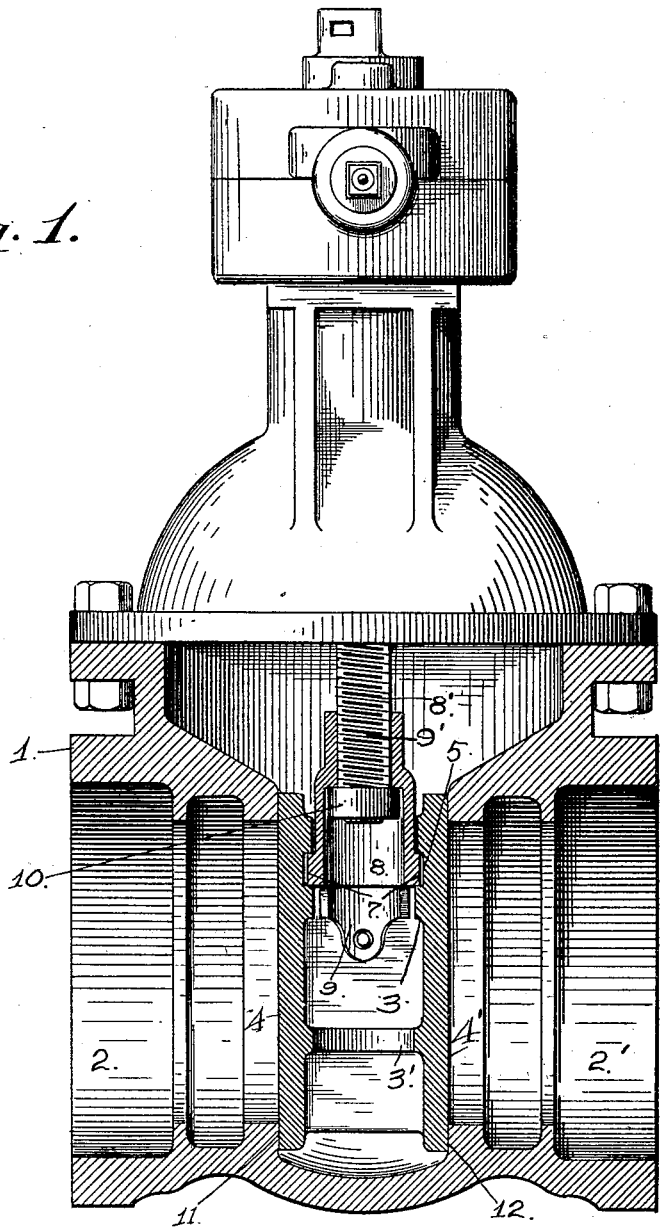

G. J. HENRY, Jr.
VALVE MECHANISM FOR GATE VALVES.
APPLICATION FILED SEPT. 15, 1909.

968,944.

Patented Aug. 30, 1910.
3 SHEETS—SHEET 1.

Witnesses
Arthur L. Slee
S. Constine

Inventor
Geo. J. Henry, Jr.
by N. A. Acker
his atty

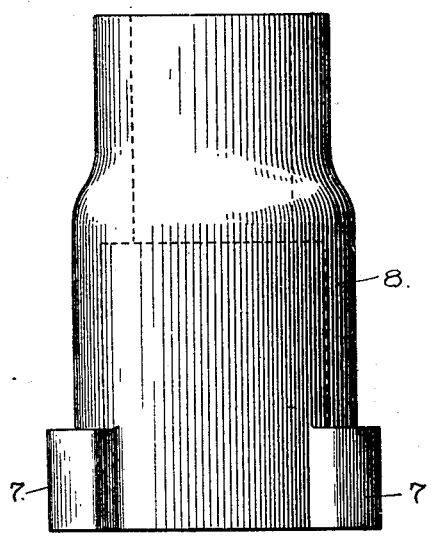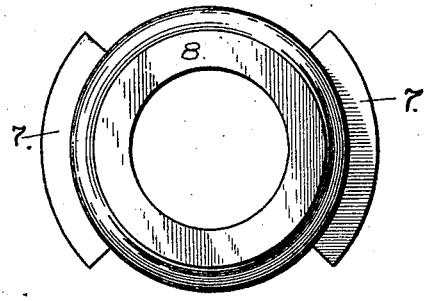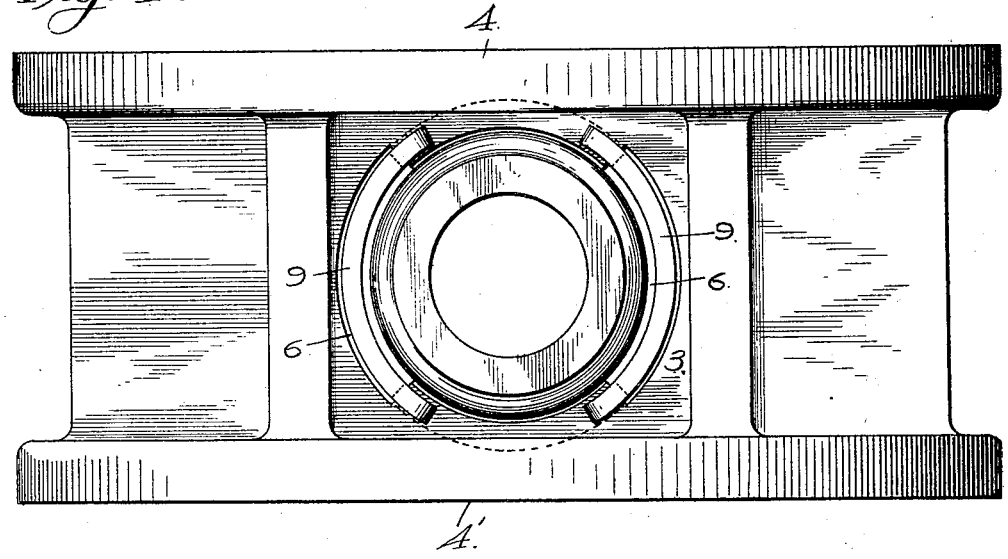

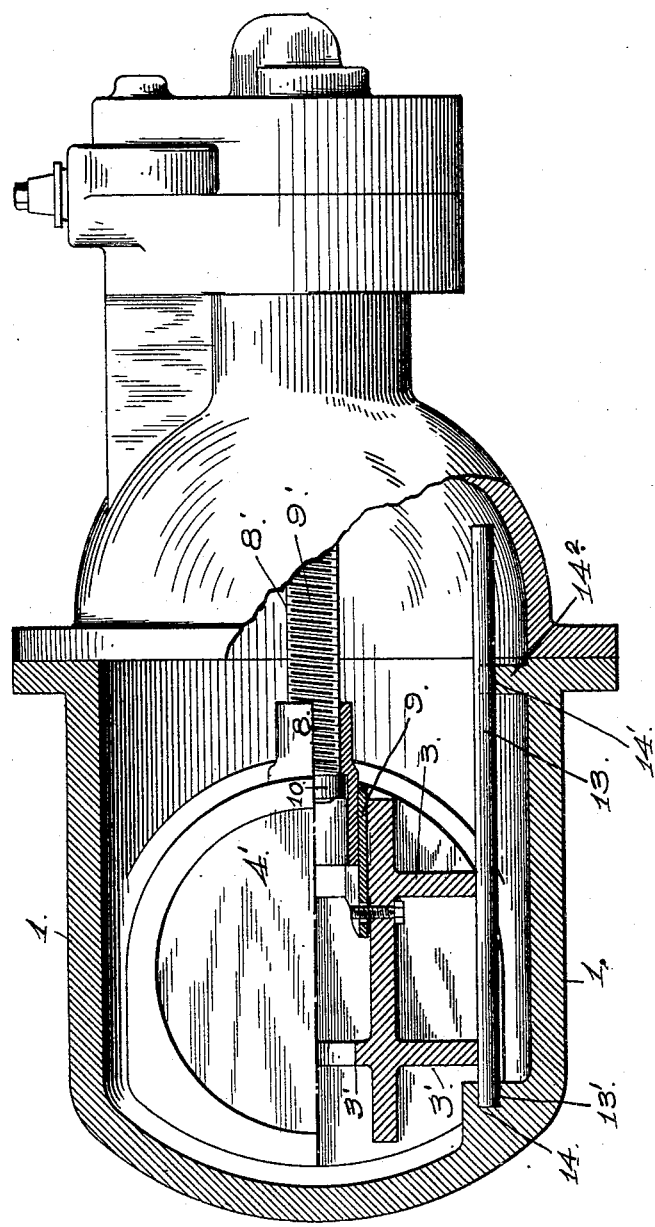

UNITED STATES PATENT OFFICE.

GEORGE J. HENRY, JR., OF SAN FRANCISCO, CALIFORNIA, ASSIGNOR OF ONE-HALF TO THE PELTON WATER WHEEL COMPANY, A CORPORATION OF CALIFORNIA.

VALVE MECHANISM FOR GATE-VALVES.

968,944.          Specification of Letters Patent.      Patented Aug. 30, 1910.

Application filed September 15, 1909. Serial No. 517,895.

*To all whom it may concern:*

Be it known that I, GEORGE J. HENRY, Jr., a citizen of the United States, residing at the city and county of San Francisco and State of California, have invented certain new and useful Improvements in Valve Mechanism for Gate-Valves, of which the following is a specification.

The hereinafter described invention relates to the construction and mounting of the valve within the casing of gate valves for use in connection with high pressure water systems; the object being to hold the valve securely seated within the valve casing by water pressure in either direction, without inducing any strains upon the valve casing other than that due to the hydrostatic pressure.

To comprehend the invention reference should be had to the accompanying sheets of drawings, wherein—

Figure 1 is a part sectional plan view of the valve casing with the valve mounted therein and connected to the valve stem for operating the valve to seat and unseat the same. Fig. 2 is a detail view of the traveling collar for connecting the valve to the operating stem. Fig. 3 is a plan view of the traveling collar. Fig. 4 is an end view of the valve disk removed from within the valve casing, said view disclosing the seat for the traveling collar connecting the valve to the operating stem. Fig. 5 is a view in side elevation, the casing being partly broken away for disclosing the supporting rod on which the valve rests and moved as forced inwardly and outwardly to close and open the passage-ways for the water, the said view disclosing a modification in the valve construction as applied to a horizontally-moving valve.

In the drawings, the numeral 1 indicates the valve casing, which, in the present case, is illustrated in horizontal position, and 2—2' the outlet passage-ways controlled by a valve slidable within the valve casing. This valve's body consists of the webs 3—3' which connect the spaced circular or disk faces 4—4', so that a double disk valve is provided, for closing respectively the valve openings 2—2'. With this construction, the valve is held firmly seated on water pressure applying thereon in either direction, inasmuch as each face of the valve seats to control independent valve openings, which openings, when the valve is unseated, communicate.

In the outer connecting web 3 for the disk faces of the valve is formed a circular grooved seat 5, which is intersected by the horizontally disposed channels 6, through which are inserted the lugs 7 projecting from the traveling collar 8, which connects the slide valve to its operating stem 8'. The traveling collar is fitted or connected to the slide valve by passing the lugs 7 through the channels or ways 6 into the circular grooved seat 5, when the collar is given approximately a half turn in order to carry the lugs 7 beneath the wall of the circular seat. Filling pieces 9 are then inserted within the channels 6 to close the same and hold the traveling collar against rotation within its seat or relative to the double disk valve.

The operating stem 8' is rotatably held within the valve casing, being operated by any given means, and on the screw threaded portion 9' thereof travels the collar 8, through internally screw threaded bore of which the valve stem extends. By means of a stop nut 10, screwed onto the inner end of the valve stem 8', the inward movement of the traveling collar 8 is arrested on the valve being seated to close the openings 2—2' of the valve casing.

In view of the fact that the connection between the valve and the traveling collar 8 is a flexible one, the said valve may swing slightly or more freely against either face of the valve seats 11—12, depending upon the direction of water pressure, and seat itself without inducing any strains upon the valve casing other than that due directly to the hydrostatic pressure. Under this construction there is permitted a certain lack of parallelism of either the valve seats or the faces of the valve disks, and this without imparting the tightness of the valve, which is held securely to its seat by the water pressure thereon.

When the gate valve is thrown into a horizontal position as herein illustrated, the same is supported and rides on the horizontally disposed rod or rail 13, Fig. 5 of the drawings, the inner end of which rod is inserted within a socket 13' formed in the lug 14 on the interior of the casing, the outer end portion of said rod resting in a seat 14' in the upper surface of the lug 14², also cast on the interior of the casing. That portion of the valve body which rests on the supporting rod or rail 13 is flattened, so that the said support has no tendency to restrain the sliding movement of the valve or cause the same to cramp its seats.

By the construction of the valve shown, viz:—a double disk valve working against two valve seats 11—12, the wedge seat usually provided gate valves for the making of a tight joint, may be dispensed with, and, inasmuch as the valve is held to its seat by water pressure, the care required to be exercised in connection with a single faced valve for the making of a secure seat is avoided, thus reducing the cost incident to the production of the gate valve. As the two faces of the valve are parallel as are also the seats in the casing and as a slight clearance exists between the seats and the valve faces to permit of free slidable movement of the said valve, and as a clearance space exists between the traveling collar and the valve at the joint therebetween, the valve is free to seat against the valve seat in either direction, due to the direction of water pressure, so that while the valve is shifted from one seat of the casing, it will be firmly held against the opposite seat of the casing. Water leakage, due to unseating of the valve on a change as to the direction of water pressure taking place, is thus provided against, as the valve is at all times held firmly onto one of the seats formed within the casing.

Having thus described the invention what is claimed as new and desired to be secured by Letters Patent is—

1. In a gate valve for high pressure water systems, the combination with the casing thereof, a spaced double faced valve slidable therein, a groove in the connecting body for the spaced faces of the valve, channels intersecting said groove, a traveling collar provided with lugs which enter the circular groove through the said channels, filling pieces for the channels, and a rotatable screw threaded stem on which said collar works to actuate the valve of the casing.

2. In a gate valve for high pressure water systems, the combination with the casing thereof provided with parallel valve seats, an integral valve composed of two parallel disks separated by a connecting body slidably mounted within the casing and acting against said seats under water pressure, a guide rail within the casing for supporting and on which said valve slides, and means for actuating said valve within the casing.

3. In a gate valve for high pressure water systems, the combination with the casing thereof provided with parallel valve seats, an integral valve structure comprising two parallel spaced disks slidably mounted therein, a screw threaded stem rotatable within the casing for actuating the valve, a traveling collar on the stem, a flexible connection between said collar and the valve, and a stop nut on the stem for positively limiting the inward movement of the traveling collar on the seating of the valve.

In testimony whereof I have signed my name to this specification in the presence of two subscribing witnesses.

GEORGE J. HENRY, Jr.

Witnesses:
N. A. ACKER,
D. B. RICHARDS.